May 12, 1925.
C. L. BAUSCH
1,537,059
APPARATUS FOR FORMING LENS GRINDING TOOLS
Filed Oct. 18, 1922  4 Sheets-Sheet 1
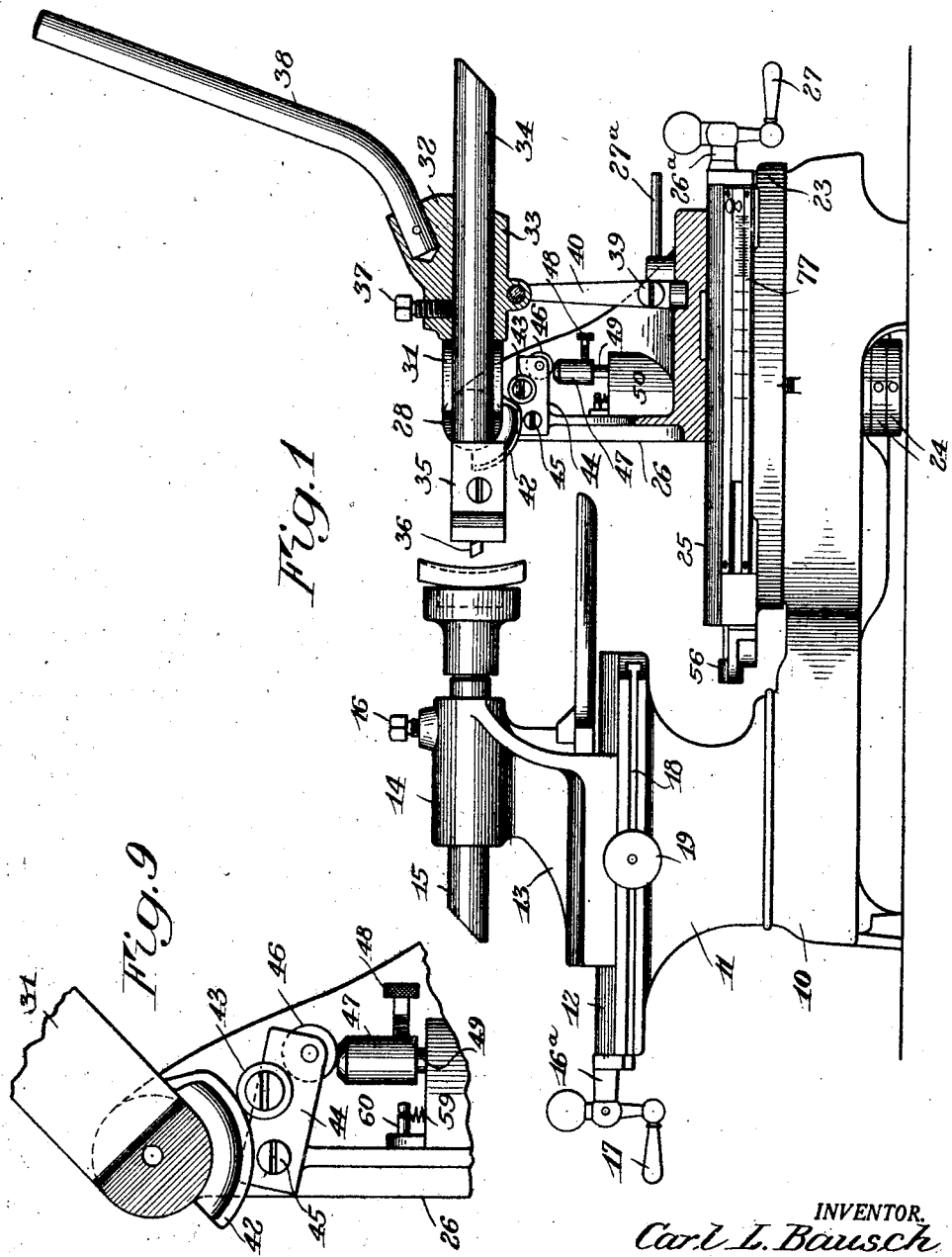
INVENTOR.
Carl L. Bausch
BY Frederick F. Church
his ATTORNEY

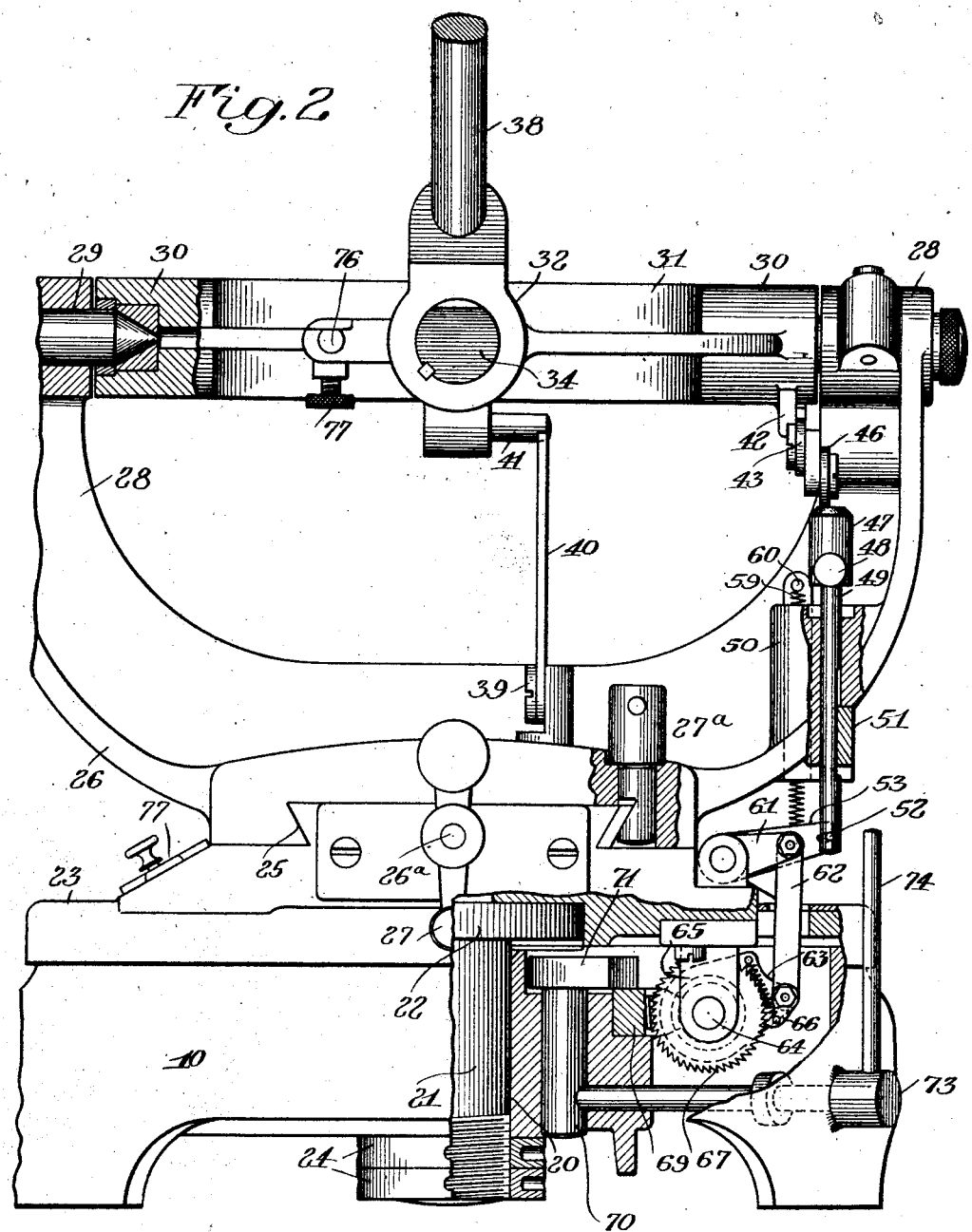

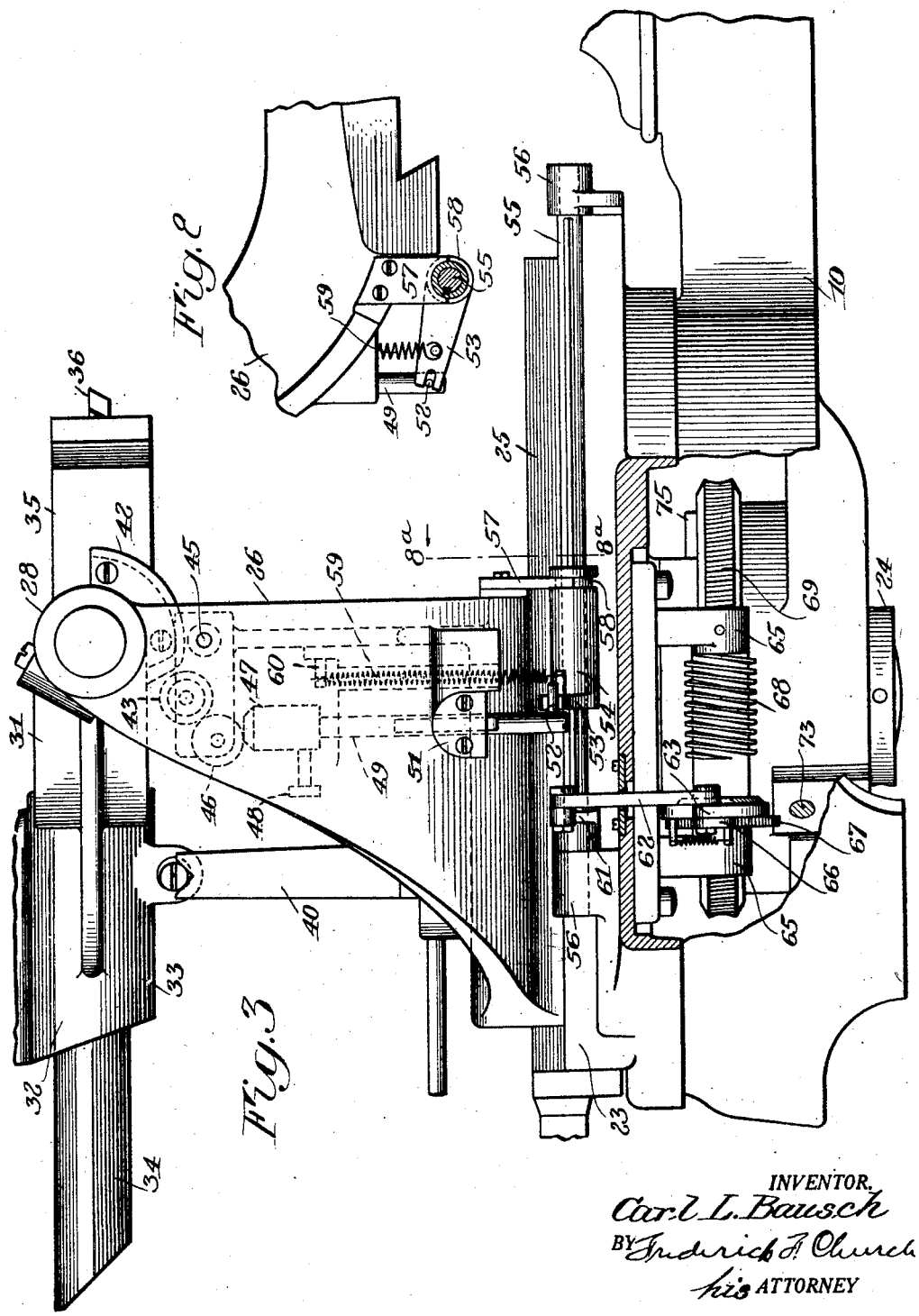

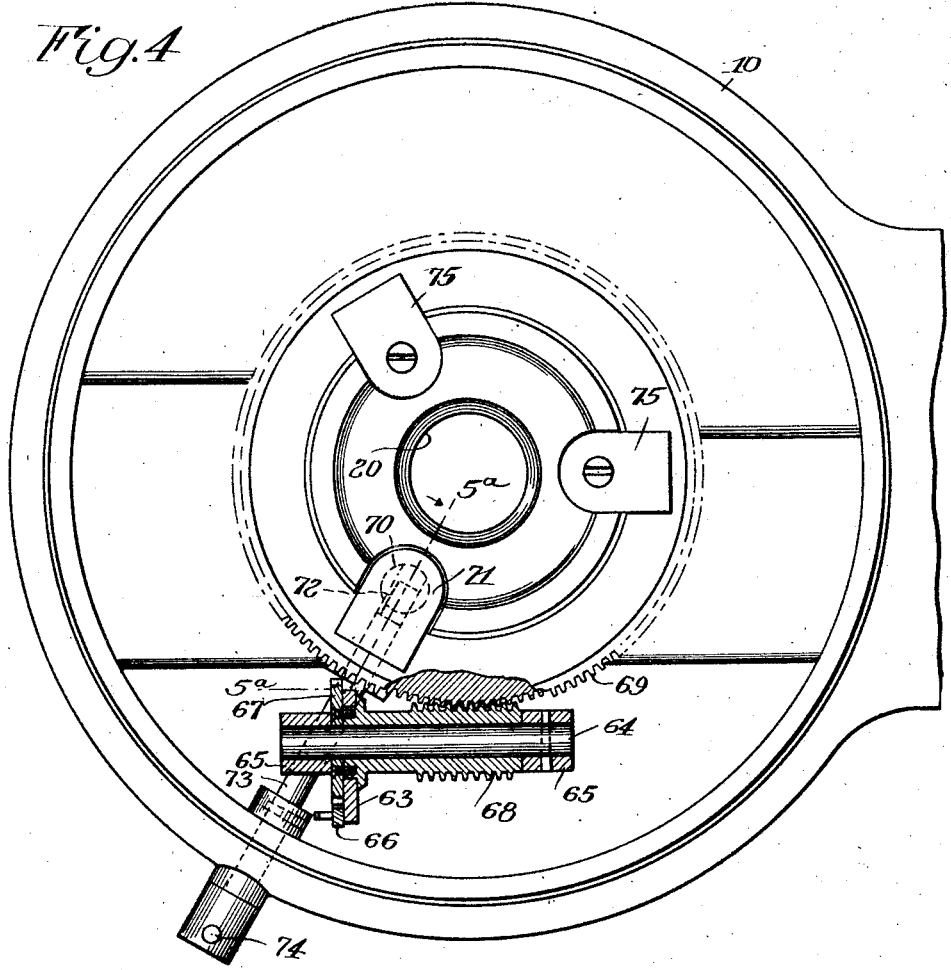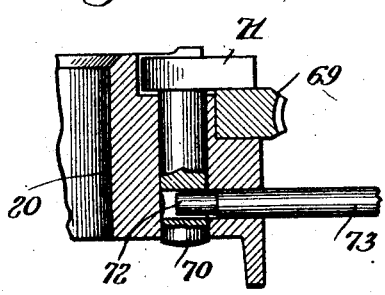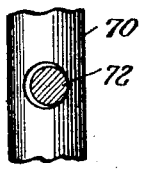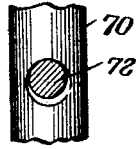

Patented May 12, 1925.

1,537,059

UNITED STATES PATENT OFFICE.

CARL L. BAUSCH, OF ROCHESTER, NEW YORK, ASSIGNOR TO BAUSCH & LOMB OPTICAL COMPANY, OF ROCHESTER, NEW YORK, A CORPORATION OF NEW YORK.

APPARATUS FOR FORMING LENS-GRINDING TOOLS.

Application filed October 18, 1922. Serial No. 595,242.

*To all whom it may concern:*

Be it known that I, CARL L. BAUSCH, of Rochester, in the county of Monroe and State of New York, have invented certain new and useful Improvements in Apparatus for Forming Lens-Grinding Tools; and I do hereby declare the following to be a full, clear, and exact description of the same, reference being had to the accompanying drawings forming a part of this specification and to the reference numerals marked thereon.

This invention relates to the art of lens grinding and more particularly to apparatus or machines for forming lens grinding tools such, for example, as the machine disclosed in my copending application for Letters Patent Serial No. 469,658, filed May 14, 1921, for Machines for forming lens grinding tools, the chief object of the present invention being to provide a machine of this character for forming or reforming toric grinding surfaces comprising mechanism actuated by the relative cutting movement about one axis of the tool and surface to be formed for automatically effecting intermittent relative swinging movement of the tool and surface about a second axis and thereby effecting also a relative feeding movement. To these and other ends the invention consists in certain improvements and combinations of parts all as will hereinafter be more fully described, the novel features being pointed out in the claims at the end of the specification.

In the drawings:

Figure 1 is a side elevation of a machine embodying the present invention;

Figure 2 is an enlarged end elevation of the same viewed from the right in Figure 1, with parts broken away and in section;

Figure 3 is an enlarged side elevation of a portion of the machine as viewed from the side opposite that shown in Figure 1;

Figure 4 is a top plan view of one end of the frame with the turret removed and parts in section to illustrate the gearing for swinging the turret and also a device for releasing the turret from the gearing connection;

Figure 5 is an enlarged section on the line $5^a$—$5^a$ in Figure 4 showing the device for releasing the turret;

Figures 6 and 7 are enlarged fragmentary detail views to illustrate the operation of parts shown in Figure 5;

Figure 8 is a fragmentary detail view of parts as seen from the line $8^a$—$8^a$ in Figure 3, and Figure 9 is an enlarged detail view of parts shown in Figure 1;

Similar reference numerals throughout the several views indicate the same parts.

The invention comprises a machine of the variety indicated above for forming or truing the toric surfaces of lens grinding tools which are referred to herein for convenience as the work. The latter is carried by an end of one of a pair of holding members or arbors, the other of which carries the tool on its adjacent end and the arbors have a relative movement about two axes for producing curvature of the work surface in two directions, or in other words, the desired toric surface. In the present instance one of the arbors is preferably oscillated in a vertical plane about one axis to produce the cutting operation and this vertical oscillation actuates mechanism for producing a step by step swinging movement of the arbor in a horizontal plane about the other axis to effect the second curvature and at the same time afford a relative feeding movement between the tools and work. The machine is adapted for forming both convex and concave surfaces by an interchangeable mounting of the arbors. The automatic mechanism for effecting the swinging movement about the second axis and simultaneously feeding the work is adjustable as conditions may require. The invention comprises also a device for disconnecting the latter mechanism after one cut on the work has been completed so that the arbor may be quickly swung back to starting position for a second cut.

Referring more particularly to the drawings there is shown at 10, Figure 1, a main frame the opposite ends of which are provided with means for supporting the tool and work arbor respectively. Thus the frame carries at one end a supporting means or table 11 provided on its top with guideways 12 which may be of the usual dove-tail or other suitable variety. Slidably carried on the guideway is a slide 13 provided with a bearing 14 in which an arbor 15 is slidably adjustable longitudinally toward and from the center of the machine, a set screw 16 being provided for clamping the arbor in adjusted position in its bearing. A threaded spindle $16^a$ is preferably rotatably mounted in supporting means 11 for cooperation with a nut (not shown) carried by the slide for adjusting the latter over the ways 12, as well understood in the art, the spindle being conveniently rotated as by means of a handle 17. At 18 is a slot in the supporting means in which is adjustably clamped a stop device indicated generally at 19 for use in setting slide 13 as disclosed in my said copending application No. 469,658. As the particular details of these portions form no part of the present invention further description thereof appears superfluous, it being apparent that the slide 13 may be adjusted to adjust arbor 15 toward and from the center of the machine and that the arbor may also be adjusted in the same direction in its bearing 14.

For supporting the second arbor, the opposite end of frame 10 is preferably formed with a bed of substantially circular shape provided adjacent its center with a bearing 20, Figures 2 and 4 rotatably receiving spindle 21 the upper end of which is flanged as at 22 and secured as by means of bolts or screws (not shown) to the under side of a supporting means or turret 23 the under surface of which has a bearing on the frame of the machine so that it may be rotated about the axis of spindle 21. The latter and the turret are firmly secured in place on the frame as by means of locking nuts 24 on the lower end of the spindle. Turret 23 is formed on its top with guideways 25 on which a slide 26 is adjustable toward and from the center of the machine by any suitable means as, for example, a threaded spindle 26ª carried by the turret and rotated by a handle 27 in engagement with a nut (not shown) carried by the slide as well understood in the art. The slide is clamped in adjusted position by any suitable clamping means such as shown at 27ª, Figures 1 and 2.

Slide 26 preferably has the general form shown in the drawings, comprising spaced standards 28, Figure 2, formed at their upper ends with bearings for trunnions 29 extending inwardly into engagement with suitable bearings in the spaced arms 30 of a supporting member or yoke 31. The arms of the yoke are carried by a central body portion 32 formed with a bearing 33 in which is supported a second holding member or arbor 34. The inner end of the latter extends adjacent the inner end of arbor 15 for cooperation therewith and has fixed thereon a tool holding means or clapper box 35 in which is secured a suitable tool 36. Arbor 34 is longitudinally slidable in its bearing relative to the horizontal axis of trunnions 29, and may be clamped in adjusted position in the yoke as by means of a set screw 37. The yoke body 32 is also formed with a socket in which is fixed a handle 38 for manually swinging or oscillating the yoke and tool about the horizontal axis. For supporting the yoke in horizontal position during adjustments or when the machine is not in use there is pivotally supported on the slide as at 39 a strut 40 adapted to engage at its upper end under a pin 41 carried by the yoke. During operation of the machine strut 40 is of course swung to one side out of the way.

It is apparent from the above description that the arbor 34 may be oscillated about the horizontal axis of trunnions 29 and also swung in a horizontal plane by swinging the turret 23 about the vertical axis of spindle 21 and the arbor may also be adjusted longitudinally relative to these axes by adjustment in yoke 32 and by the adjustment of slide 26 on the turret.

In the present machine arbor 34 is preferably oscillated in a vertical plane by the manual means described to produce cutting action and generate one curvature and is given a step by step or intermittent swinging movement in a horizontal plane to produce the other curvature and also a relative feeding movement of the tool and work, although of course the planes of these movements may be reversed and the cutting movement may be produced by power driven means if so desired.

The relative feeding movement of the tool and work is accomplished automatically by mechanism actuated by the cutting movement and comprising preferably a cam 42, Figures 1 and 9, carried by one of the arms of yoke 31 for engagement during the movement of the yoke with a roller 43 supported on an arm 44 pivoted on the slide as at 45. The arm carries a roller 46 bearing against the upper end of a head 47 adjustably fixed as by means of a screw 48 on the upper end of a plunger 49 sliding vertically in a bearing 50 provided on the adjacent standard of the slide. The plunger is prevented from rotating in its bearing by means of a key 51 and carries at its lower end below the bearing a projecting pin 52. This pin is embraced by the forked end of an arm 53 carried by a sleeve 54 splined for sliding movement on a rock shaft 55 supported in the bearings 56 on the turret. A short arm 57 fixed on the slide engages in a circumferential slot 58 in the sleeve so that the latter is moved with the slide and maintained in cooperating relation therewith. This construction therefore serves to produce a rocking movement of shaft 55 whenever arbor 34 is oscillated in a vertical plane, the plunger being moved upwardly and maintained in engagement with roller 46 by means of a tension spring 59 fixed at one end to arm 53 of sleeve 54 and at the other to a pin 60 carried by the slide.

The described rocking movement of shaft 55 serves to intermittently actuate a gearing connection between the frame and turret for swinging the latter step by step about its vertical axis. For this purpose shaft 55 has fixed thereon an arm 61, Figure 2, connected by means of a link 62 with a plate 63 pivotally supported on a short shaft 64 rotatably supported in bearings 65 depending from the under side of the turret. Plate 63 carries a spring actuated pivoted pawl 66 cooperating with a ratchet wheel 67 fixed on shaft 64. The latter has fixed thereon a worm 68 meshing with an annular worm gear 69 which is normally fixed on an annular bearing surface on the frame under the turret. It is apparent from this construction that the oscillation of the second arbor 34 and the consequent rocking movement of shaft 55 actuate the pawl and ratchet means described to effect an intermittent rotation of worm 68 and a corresponding step by step swinging movement of the turret in one direction. This swinging movement of the turret about its vertical axis, as already stated serves to generate the second curvature and also to afford a relative feeding movement between the tools and work. By adjusting the head 47 of plunger 49 the length of the latter and the effective stroke of pawl 66 may be varied to adjust the rate of feed.

When a cut has been completed it is desirable to release the turret from its gearing connection with the frame so that it may be quickly swung back to starting position and this is accomplished by a device comprising in the present instance a post 70 sliding vertically in a bearing in the frame inside the annular worm gear 69 and provided at its upper end with a head 71 for engagement with the worm gear to clamp the latter in position on its bearing on the frame. The post is actuated vertically by the eccentrically formed end 72 of a spindle 73 which engages in an opening in the lower end of the post. The spindle is rotatably supported in bearings in the frame and is provided with an operating handle 74 which may be swung in one direction to clamp the worm gear to the frame in which arrangement the turret is automatically swung about its vertical axis as the arbor 34 is oscillated about its horizontal axis. Movement of handle 34 in the other direction however releases worm gear 69 so that the turret may then be freely swung in the opposite direction. The release of the turret is also convenient for turning the same to facilitate insertion or removal of the arbors. The frame is preferably provided with keepers 75, Figure 4, projecting above the worm gear at spaced intervals to maintain it on its bearing.

The degree of curvature of the toric surface in one direction depends of course upon the distance of the point of cutting from the horizontal axis of yoke 31, or in other words upon the longitudinal adjustment of arbor 34 relative to this axis. This adjustment is made by means of a suitable gage bar (not shown) adapted to be slidably adjusted in a bearing 76, Figure 2, in yoke 31 for engagement with the point of the tool and in cooperation with an indicating scale on the yoke, as described in my said copending application. A set screw 77 is provided for clamping such gage bar in position. The curvature of the toric surface in the other direction depends upon the radial distance of the point of cutting from the vertical axis of turret 23. This distance is determined by a suitable scale means indicated at 77, Figure 1, which however, is also fully described in my said copending application so that description in detail herein is unnecessary.

The drawings show the arrangement of the tools and work for cutting a concave surface but the arbors 15 and 34 may be interchanged so that the work instead of the tools is given the swinging movements described, for cutting convex surfaces.

In operation the tool arbor is adjusted in either bearing in which it may be placed to locate the point of the tool at the proper distance from the axes of swinging movement for producing the respective curvatures desired. The work arbor is located in the opposite bearing and adjusted for the proper depth of cut. Yoke 31 is then oscillated about its horizontal axis to produce a relative cutting movement between the work and tool and after each such movement arbor 34 is swung through a small horizontal arc by the automatic mechanism described for producing curvature of the surface in a horizontal direction and feeding the work and tools relatively to each other. It is thus merely necessary in use to oscillate the handle 38 from a starting position at one side of the surface to be cut until the cut is completed, the swinging movement in the other direction and also the feeding of the tools and work being taken care of automatically. When one cut has been completed handle 74 may be operated to release the gearing connection between the frame and turret after which the latter may be quickly swung in the other direction and the gearing connection reestablished for taking a new cut. The machine is simple and rugged in construction, convenient to adjust and accurate and rapid in operation.

I claim as my invention:

1. In a machine of the class described, the combination of a frame, supporting means thereon, a pair of cooperating holding members carried by said supporting means, one of said members having a swinging movement on said supporting means about each of a pair of axes, mechanism actuated by movement of said latter member about one axis for automatically moving the same about the other of said axes, and a tool carried by one of said holding members for cooperation with a work piece carried by the other.

2. In a machine of the class described, the combination of a frame, supporting means thereon, a pair of cooperating holding members carried by said supporting means with their ends extending into proximity with each other, one of said members having a swinging and also a longitudinal adjusting movement on said supporting means relative to each of a pair of axes thereof, mechanism actuated by swinging movement of said latter member about one of said axes for automatically imparting to said latter member a step by step swinging movement about the other of said axes, and a tool carried by one of said members for cooperation with a work piece carried by the other.

3. In a machine of the class described, the combination of supporting means, a pair of cooperating holding members carried by said supporting means, one of said members having an oscillating movement about each of a pair of axes, manual means for oscillating said member about one axis, mechanism actuated automatically by the oscillation of said latter member for imparting a step by step movement thereto about the other of said axes, and a tool carried by one of said members for cooperation with work carried by the other.

4. In a machine of the class described, the combination of a frame, supporting means on said frame comprising a movable slide provided with a bearing, an arbor slidable in said bearing, additional supporting means on said frame provided with a bearing, a second arbor slidably supported in said bearing for longitudinal adjustment and for oscillation relative to each of a pair of axes, mechanism actuated automatically by oscillation of said second arbor about one axis for imparting a step by step movement thereto about the other of said axes, and a tool carried by one of said arbors for cooperation with work carried by the other.

5. In a machine of the class described, the combination of a frame, supporting means on the frame, a holding member adjustably supported by said means, a turret supported on the frame for swinging movement about one axis, a part provided with a bearing and mounted on said turret for swinging movement about a second axis and for movement toward and from said first axis, a second holding member adjustably carried by said bearing for adjustment relative to said second axis and having an end thereof disposed adjacent an end of said first holding member, mechanism actuated automatically by movement of said second holding member about one axis for imparting a step by step movement thereto about the other axis, and tool means carried by one of said members for cooperation with work carried by the other.

6. In a machine of the class described, the combination of a frame, a holding member adjustably supported thereon, supporting means on said frame having a swinging movement about one axis, a second holding member on said supporting means having a swinging movement about another axis, gearing connecting said frame and supporting means for swinging the latter about said axis in one direction, mechanism actuated automatically by said swinging movement of said second holding member for actuating said gearing, and a device for releasing said gearing connection to free said supporting means for swinging movement in the other direction.

7. In a machine of the class described, the combination of a frame, a holding member adjustably supported thereon, supporting means on said frame having a swinging movement about one axis, a second holding member on said supporting means having an oscillating movement about another axis, a worm gear rotatably carried by said frame, a worm carried by said supporting means in mesh with said gear, mechanism actuated automatically by the oscillation of said second holding member about said other axis for rotating said worm, a device for releasably clamping said worm gear to said frame, and tool means on one of said holding members for cooperation with work carried by the other.

8. In a machine of the class described, the combination of a frame, a holding member adjustably supported thereon, a turret having a swinging movement on said frame about one axis, gearing connecting said frame and turret for swinging the latter, pawl and ratchet means for intermittently actuating said gearing, a supporting member having an oscillating movement on said turret about another axis, a second holding member adjustably carried by said supporting member, tool means carried by one of said holding members for cooperation with work carried by the other, and mechanism actuated by said oscillating movement of said supporting member for actuating said pawl and ratchet means.

9. In a machine of the class described, the combination of a frame, a holding member adjustably supported thereon, a turret having a swinging movement on said frame about one axis, gearing connecting said frame and turret for swinging the latter, a supporting member having an oscillating movement on said turret about another axis, a second holding member adjustably carried by said supporting member, tool means on one of said holding members for cooperation with work carried by the other, and mechanism comprising cam means on said supporting member, a plunger actuated by said cam means and pawl and ratchet means actuated by said plunger for intermittently actuating said gearing.

10. In a machine of the class described, the combination of a frame, a holding member adjustably supported thereon, a turret having a swinging movement on said frame about one axis, gearing connecting said frame and turret for swinging the latter, a slide movable on said turret, a supporting member having an oscillating movement on said slide about another axis, a secondary holding member adjustably carried by said supporting member, tool means on one supporting member for cooperation with work carried by the other, pawl and ratchet means for intermittently actuating said gearing, and mechanism comprising a rock shaft actuated by oscillation of said supporting member for actuating said pawl and ratchet means.

11. In a machine of the class described, the combination of a frame, a holding member adjustably supported thereon, a turret having a swinging movement on said frame about one axis, gearing connecting said frame and turret for swinging the latter, a slide movable on said turret, a supporting member having an oscillating movement on said slide about another axis, a second holding member adjustably carried by said supporting member, tool means on one supporting member for cooperation with work carried by the other, pawl and ratchet means for intermittently actuating said gearing, a rock shaft carried by said turret and connected with said pawl and ratchet means, an element splined on said shaft for movement on the turret with said slide, and mechanism actuated by oscillation of said supporting member for rocking said element and shaft.

12. In a machine of the class described, the combination of a frame, a holding member adjustably supported thereon, a turret having a swinging movement on said frame about one axis, a gearing connection between said frame and turret for swinging the latter in one direction, a slide movable on said turret radially of the axis thereof, a supporting member having an oscillating movement on said slide about another axis, a second holding member adjustable on said supporting member radially of the axis thereof, a rock shaft, pawl and ratchet means actuated by said shaft for intermittently actuating said gearing, means actuated by oscillation of said supporting member for rocking said shaft, a device for releasing said gearing connection to permit quick return of said turret in the other direction, and tool means on one of said holding members for cooperation with work carried by the other.

CARL L. BAUSCH.